(12) United States Patent
Sarapure et al.

(10) Patent No.: US 10,142,252 B2
(45) Date of Patent: Nov. 27, 2018

(54) SERVER INTELLIGENCE FOR NETWORK SPEED TESTING CONTROL

(71) Applicant: Verizon Patent and Licensing Inc., Arlington, VA (US)

(72) Inventors: Raghavendra Sarapure, Irving, TX (US); Vipul Jha, Plano, TX (US); Kumar Rajan, Clinton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 15/191,679

(22) Filed: Jun. 24, 2016

(65) Prior Publication Data
US 2017/0373984 A1 Dec. 28, 2017

(51) Int. Cl.
*H04L 12/805* (2013.01)
*H04L 12/26* (2006.01)
*H04L 12/841* (2013.01)

(52) U.S. Cl.
CPC ........ *H04L 47/365* (2013.01); *H04L 43/0894* (2013.01); *H04L 43/50* (2013.01); *H04L 47/28* (2013.01)

(58) Field of Classification Search
USPC ................................ 709/224, 200, 203, 217
See application file for complete search history.

(56) References Cited

U.S. PATENT DOCUMENTS

| | | | |
|---|---|---|---|
| 2006/0041917 A1* | 2/2006 | Vellanki | H04L 67/2823 725/86 |
| 2012/0042000 A1* | 2/2012 | Heins | G06Q 10/10 709/201 |
| 2013/0191360 A1* | 7/2013 | Burkard | G06F 17/30902 707/706 |
| 2016/0301756 A1* | 10/2016 | Dahlstrom | H04L 67/125 |

* cited by examiner

Primary Examiner — El Hadji M Sall (57) ABSTRACT

A network device receives, from a client device, a request to perform a network speed test of a network connecting the client device and the network device. The network device conducts a trial test, involving data delivery between the network device and the client device, to determine an approximate capacity of the network. The network device selects an optimum data size based on results of the trial test, and selects a number of threads needed to saturate the network based on the results of the trial test. The network device controls conducting of the network speed test, using a control thread from the network device to the client device, wherein the network speed test utilizes the optimum data size and the selected number of threads.

20 Claims, 10 Drawing Sheets

SERVER INTELLIGENCE FOR NETWORK SPEED TESTING CONTROL

BACKGROUND

Networks have various measures of service quality. Bandwidth, throughput, and latency are typical service quality parameters that can be measured with respect to a particular network. Bandwidth is typically measured in bits per second and represents the maximum rate that data can be transferred across the network from a sender to a receiver. Throughput is typically measured in bits per second and represents the actual rate that data is transferred across the network from the sender to the receiver. The available channel bandwidth and signal-to-noise ratio determine the maximum possible throughput. Latency is typically measured in seconds (or fractions of a second) and represents the travel time delay between the sender sending data and the receiver receiving and decoding the data. Latency, therefore, is principally a function of the travel time of the data as it traverses the network between the sender and the receiver, and any processing time at any intervening nodes the data traverses.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein use intelligence resident in a server for exercising control, in a manner described herein, of the conducting of upload and download network speed tests between the server and requesting client devices. The intelligence implemented at the server may exercise control of the conducting of a download, or an upload, speed test using a control thread between the server and the requesting client device. The intelligence implemented at the server may first cause a trial speed test to be performed between the server and the requesting client device, and may then select an optimum data block length, a number of speed test threads, a number of speed test iterations, and a speed test iteration duration based on results of the trial speed test. The intelligence implemented at the server may then exercise control of the actual download and/or upload network speed test utilizing the selected data block length, the selected number of speed test threads, the selected number of speed test iterations, and the selected speed test iteration duration.

Figure 1:
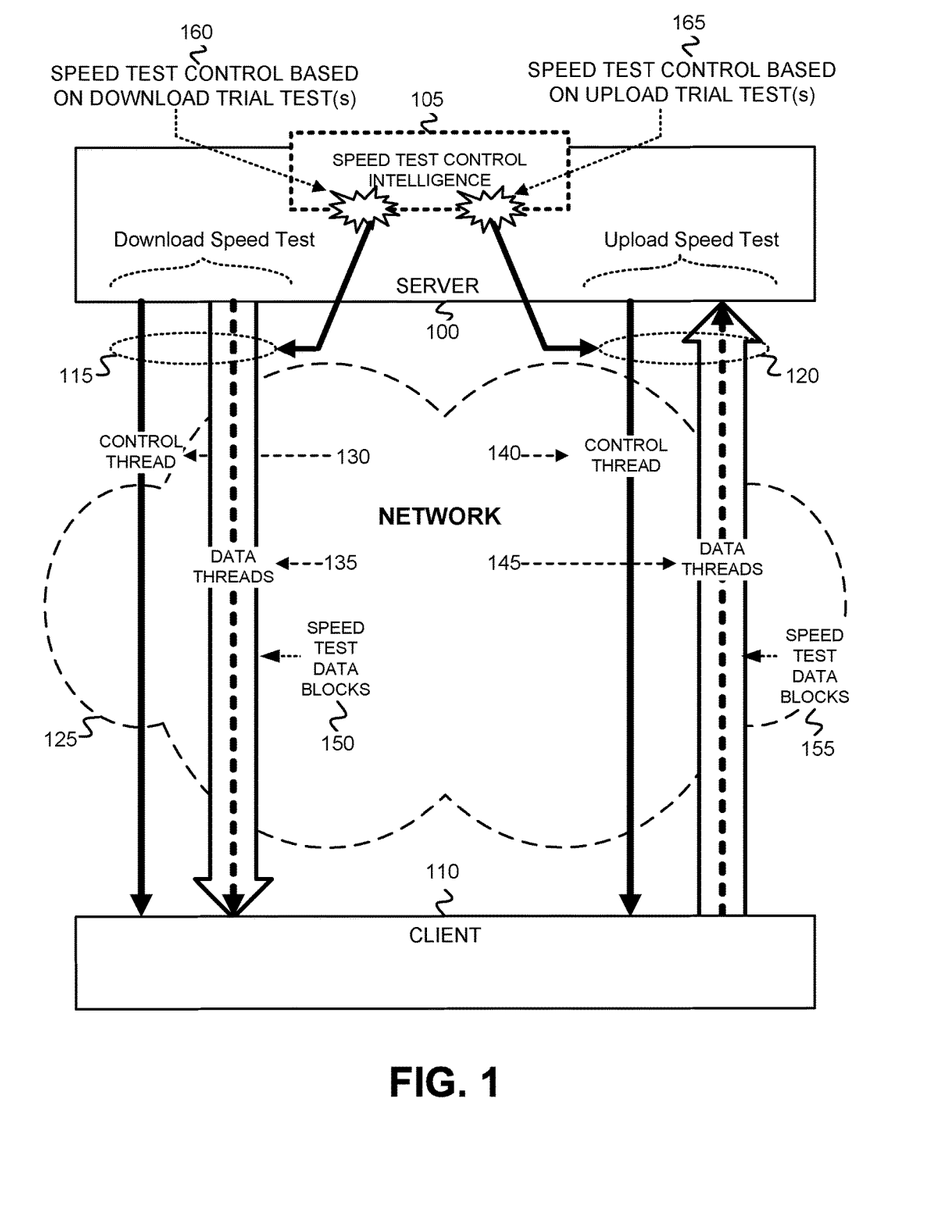
FIG. 1 is a diagram that depicts an overview of the use of speed test control intelligence, residing in a server, for controlling the conducting of upload and download network speed tests associated with a network to which a particular client device is connected.

FIG. 1 is a diagram that depicts an overview of the use of speed test control intelligence, residing in a server, for exercising control over the conducting of upload and download network speed tests associated with a network to which a particular client device is connected. As shown, a server 100 implements speed test control intelligence 105 that exercises control of the conducting of a download speed test 115 and/or an upload speed test 120 between server 100 and a client device 110 across a particular network 125. Speed test control intelligence 105 exercises control of download speed test 115, using a control thread 130, based on one or more download trial tests 160. During conducting of download speed test 115, server 100 sends speed test data blocks 150 via multiple data threads 135 to client 110. A "data blocks" or a "block of data," referred to herein with respect to download speed test 115 and/or upload speed test 120, refers to a discrete chunk or segment of data having a specific length that is transmitted as a single block. In one implementation, the discrete chunk or segment of data of the specific length may be encapsulated (i.e., includes "header" information further including control and/or other information related to the specific speed test). As some specific examples, a "data block" may include a block of speed test data having a length of 1 Megabyte (MB), a block of speed test data having a length of 25 MB, or a block of speed test data having a length of 100 MB. Other sizes of data blocks, however, may be used, with the sizes of the data blocks being determined based on results of initial upload or download tests, as described in further detail below. Web sockets, for example, may be used to transmit the multiple data threads 135 from server 100 to client 110. The optimum data block length, number of data threads 135, and number of test iterations associated with the speed test data blocks 150 may be determined by speed test control intelligence 105 of server 100, as described in further detail below, based on results of the download trial test(s).

Speed test control intelligence 105 further exercises control of the upload speed test 120, using a control thread 140, based on one or more upload trials tests 165. During the conducting of upload speed test 120, server 100 causes client 110 to send speed test data blocks 155 via multiple data threads 145 to server 100. Web sockets, for example, may be used to transmit the multiple data threads 145 from client 110 to server 100. The optimum data block length, number of data threads 145, and number of test iterations associated with the speed test data blocks 155 may be determined by speed test control intelligence 105 of server 100, as described in further detail below, based on results of the upload trial test(s).

Figure 2:
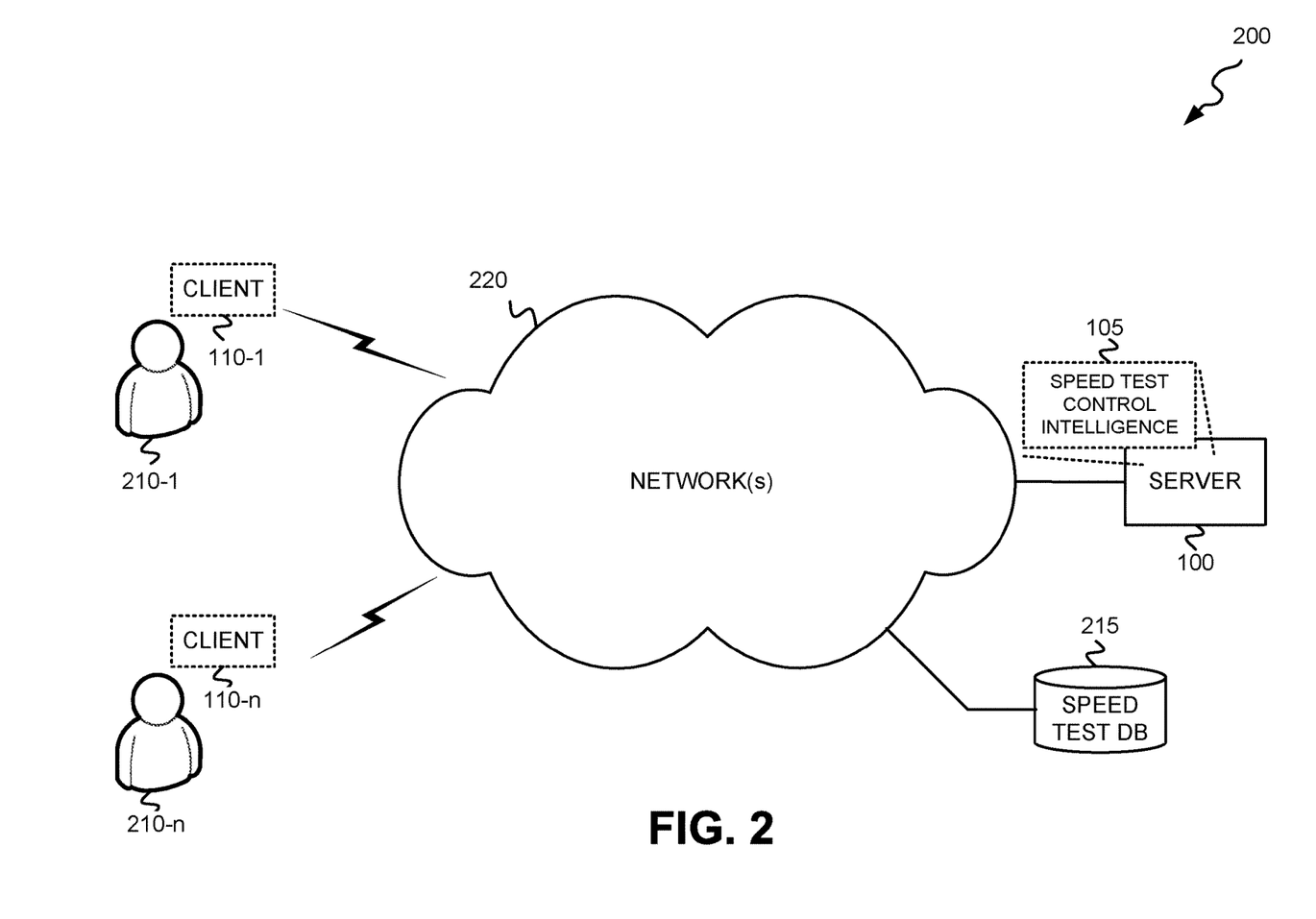
FIG. 2 is a diagram that depicts an exemplary network environment in which server-controlled network speed tests, involving client devices connected to the network, may be performed.

FIG. 2 is a diagram that depicts an exemplary network environment 200 in which server-controlled network speed tests, involving client devices connected to a network, may be performed. Network environment 200 includes server 100, client devices 110-1 through 110-n (where n is greater than or equal to one), speed test database (DB) 215, and network(s) 220.

Server 100 includes one or more network devices that connect to network (s) 220 and which include speed test control intelligence 105 for exercising control of upload and/or download speed tests performed between server 100 and client devices 110-1 through 110-n.

Client devices 110 (generically referred to herein as "client device 110," "client devices 110", "client 110," or "clients 110,") each include an electronic device that further includes a communication interface (e.g., wired or wireless) for communicating via network(s) 220. Client devices 110 may each include, for example, a cellular radiotelephone; a smart phone; a personal digital assistant (PDA); a wearable computer; a desktop, laptop, palmtop or tablet computer; or a media player. Client devices 110 may, however, include any type of electronic device that includes a communication interface for communicating via network(s) 220. Client devices 110 may include data communication software that may be controlled, as described herein, by speed test control intelligence 105 of server 100, during a download and/or upload speed test. As shown in FIG. 2, a respective user 210-1 through 210-n (generically referred to herein as "user 210" or "users 210") is associated with each of client devices 110-1 through 110-n. Each user 210 may be an owner, operator, and/or a permanent or temporary user of a respective client device 110.

Speed test DB 215 includes one or more network devices that store one or more data structures into which data is stored, and retrieved from storage, by server 100. One exemplary implementation of a data structure of speed test DB 215 is described below with respect to FIG. 4.

Network(s) 220 includes one or more networks of any type, such as, for example, a telecommunications network (e.g., a Public Switched Telephone Network (PSTN)), a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. In one implementation, network(s) 220 may include a PLMN connected to one or more other networks (e.g., the Internet).

The configuration of the components of network environment 200 depicted in FIG. 2 is for illustrative purposes only. It should be understood that other configurations may be implemented. Therefore, network environment 200 may include additional, fewer and/or different components, that may be configured differently, than depicted in FIG. 1.

Figure 3:
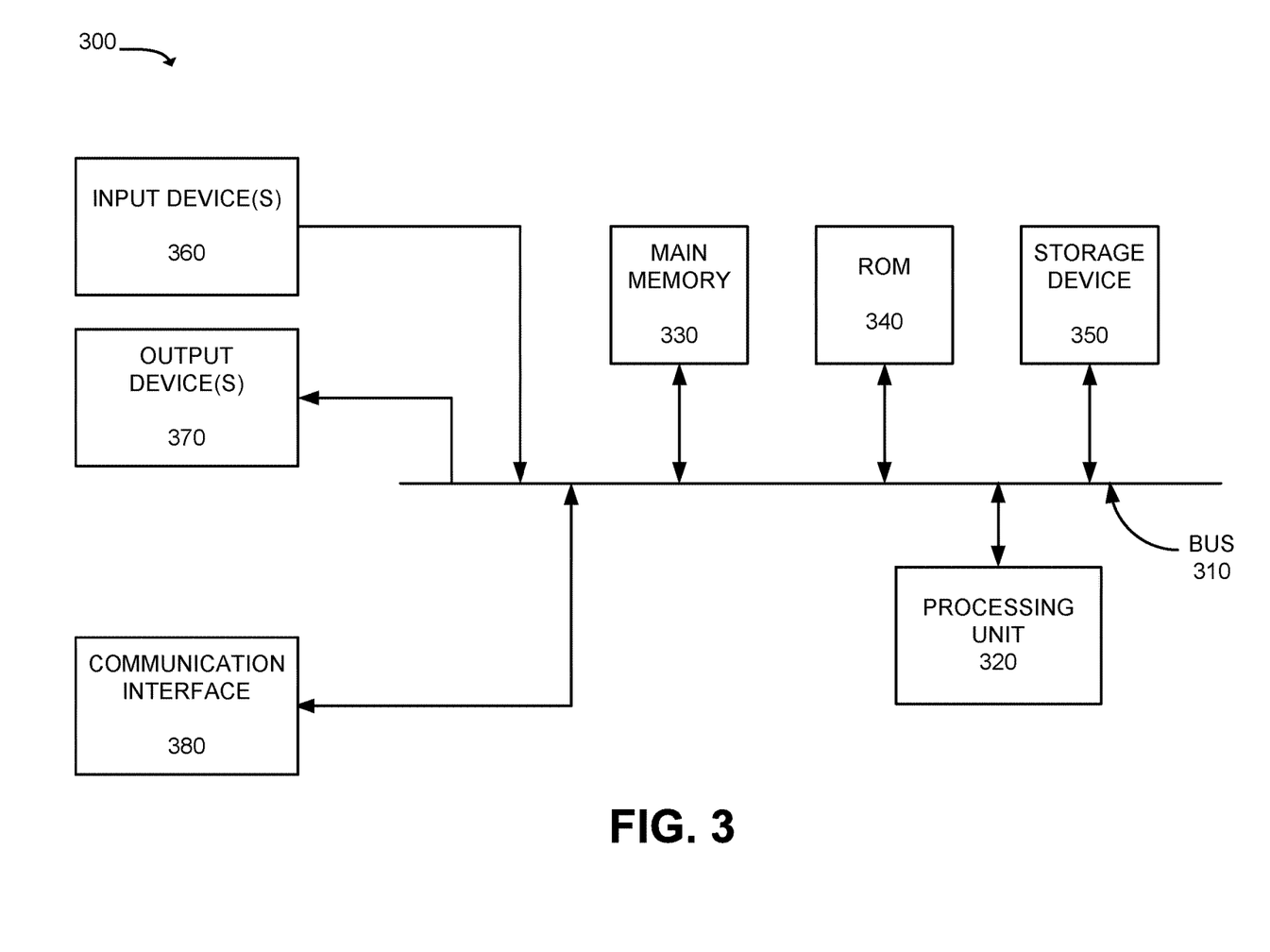
FIG. 3 is a diagram of exemplary components of a device that may correspond to the mobile devices, the server, and/or the database of FIG. 2.

FIG. 3 is a diagram of exemplary components of a device 300. Server 100, client devices 110, and/or speed test DB 215 may each include the same, or similar components, in a same or similar configuration to that depicted in FIG. 3. Device 300 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the elements of device 300.

Processing unit 320 may include a processor or microprocessor that interprets and executes software instructions, or logic that implements one or more instructions in hardware. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive. Main memory 330, ROM 340 and storage device 350 may each be referred to herein as a "tangible non-transitory computer-readable medium."

Input device(s) 360 may include one or more mechanisms that permit a user or operator to input information to device 300, such as, for example, a keypad or a keyboard, a display with a touch sensitive panel, voice recognition and/or biometric mechanisms, etc. Output device(s) 370 may include one or more mechanisms that output information to the operator or user, including a display, a speaker, etc. Input device 360 and output device 370 may, in some implementations, be implemented as a graphical user interface (GUI) that displays GUI information and which receives user input via the GUI. Communication interface(s) 380 may include one or more transceivers that enable device 300 to communicate with other devices and/or systems. For example, communication interface(s) 380 may include wired and/or wireless transceivers for communicating via network(s) 220. If device 300 is a client device 110, then communication interface(s) 380 may include a wireless transceiver (including one or more antennas) for communicating via a PLMN.

Device 300 may perform certain operations or processes, as may be described in detail below. Device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface(s) 380. The software instructions contained in main memory 330 may cause processing unit 320 to perform operations or processes that will be described later. Alternatively, hardwired circuitry and/or logic may be used in place of, or in combination with, software instructions to implement processes described herein. Thus, exemplary implementations are not limited to any specific combination of hardware circuitry and software.

The configuration of components of device 300 illustrated in FIG. 3 is for illustrative purposes only. It should be understood that other configurations may be implemented. Therefore, device 300 may include additional, fewer and/or different components, arranged in a different configuration, than depicted in FIG. 3.

Figure 4:
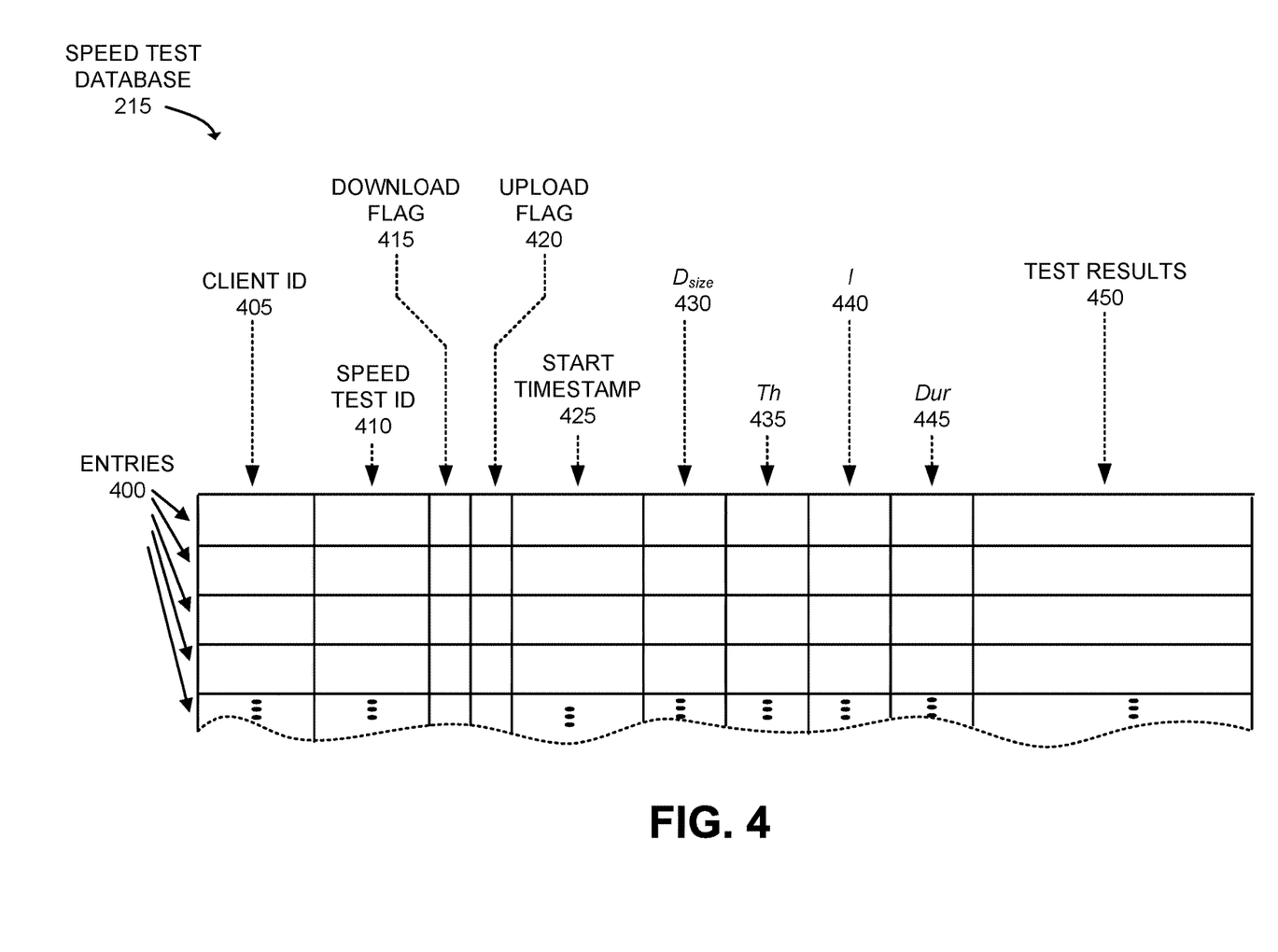
FIG. 4 is a diagram that depicts an exemplary implementation of a data structure stored in the speed test database of FIG. 2.

FIG. 4 is a diagram that depicts an exemplary implementation of a data structure stored in speed test DB 215. As shown, the data structure of speed test DB 215 may include a tabular data structure that further includes multiple entries 400, with each entry 400 including a client identifier (ID) 405 field, a speed test ID field 410, a download flag field 415, an upload flag field 420, a start timestamp field 425, an optimum data block length ($D_{size}$) field 430, a number (T) of threads field 435, a number (I) of test iterations field 440, a test iteration duration (Dur) field 445, and a test results field 450. Descriptions of the various fields with respect to FIG. 4, unless stated otherwise, relate to the data of the fields of a same entry 400 of DB 215.

Client identifier (ID) 405 field stores data that uniquely identifies a particular client device 110 with which server 100 engages in an upload or download speed test. Client ID 405 field may store, example, an Internet Protocol (IP) address associated with the client device 110. Speed test ID field 410 stores data that uniquely identifies a particular speed test for a particular client device 110. Speed test ID field 410 may store, for example, a sequence number that is incremented for each additional speed test requested by the client device 110 identified in field 405.

Download flag field 415 stores a flag that, when set, indicates that the speed test identified in field 410 for the client device 110 identified in field 405 is a download speed test. In one implementation, if the download flag has a value of one, then the download flag is considered "set," and if the download flag has a value of zero, then the download flag is considered "reset." Upload flag field 420 stores a flag that, when set, indicates that the speed test identified in field 410 for the client device identified in field 405 is an upload speed test. In one implementation, if the upload flag has a value of one, then the upload flag is considered "set," and if the upload flag has a value of zero, then the upload flag is considered "reset." If upload flag is set, then the download flag is reset, and, conversely, if the upload flag is reset, then the download flag is set.

Start timestamp field 425 stores data that indicates a time at which an upload or download speed test has commenced. In one implementation, the time may include a Universal Time, Coordinated (UTC) encoded for storage in field 425. Optimum data block length ($D_{size}$) field 430 stores data that indicates a particular data block data size chosen ($D_{size}^{DOWN}$ or $D_{size}^{UP}$), as described further herein, by speed test control intelligence 105 of server 100 as an optimum data block length for conducting an upload or download speed test.

Number (Th) of threads field 435 stores data that indicates a number of threads chosen, as described herein, by speed test control intelligence 105 of server 100 as the number of threads ($Th^{DOWN}$ or $Th^{UP}$) required to saturate network 220 between server 100 and client device 110 during each iteration of the upload or download speed test. Number (I) of test iterations field 440 stores data that indicates a number of test iterations selected, as described herein, by speed test control intelligence 105 of server 100 as the number of different iterations ($I^{DOWN}$ or $I^{UP}$) of the download or upload speed test to be performed, with each iteration having speed test data having a data block size $D_{size}$ as stored in field 430, and a number of threads as stored in field 435.

Test iteration duration (Dur) field 445 stores data that indicates a duration ($Dur^{UP}$ or $Dur^{DOWN}$) of each test iteration selected, as described herein, by speed test control intelligence 105 of server 100 as a length of time over which an iteration of the upload or download test occurs. Test results field 450 stores data that indicates various measured test results associated with the upload or download speed test. Such measured test results may include, as one example, upload or download throughput.

Speed test DB 215 is depicted in FIG. 4 as including a tabular data structure with a certain number of fields storing certain content. The tabular data structure of DB 215 shown in FIG. 4, however, is for illustrative purposes. Other types of data structures may alternatively be used. The number, types, and content of the entries and/or fields in the data structures of DB 215 illustrated in FIG. 4 are also for illustrative purposes. Other data structures having different numbers of, types of and/or content of, the entries and/or the fields may be implemented. Therefore, speed test DB 215 may include additional, fewer and/or different entries and/or fields than those depicted in FIG. 4. Data may be retrieved from DB 215 by, for example, indexing one or more of fields 405-450 with particular data to find a match between the particular data and the data stored in the indexed field. When a match is found in a particular entry 400 of DB 215, data may then be retrieved from a particular field of the entry 400.

Figure 5A:
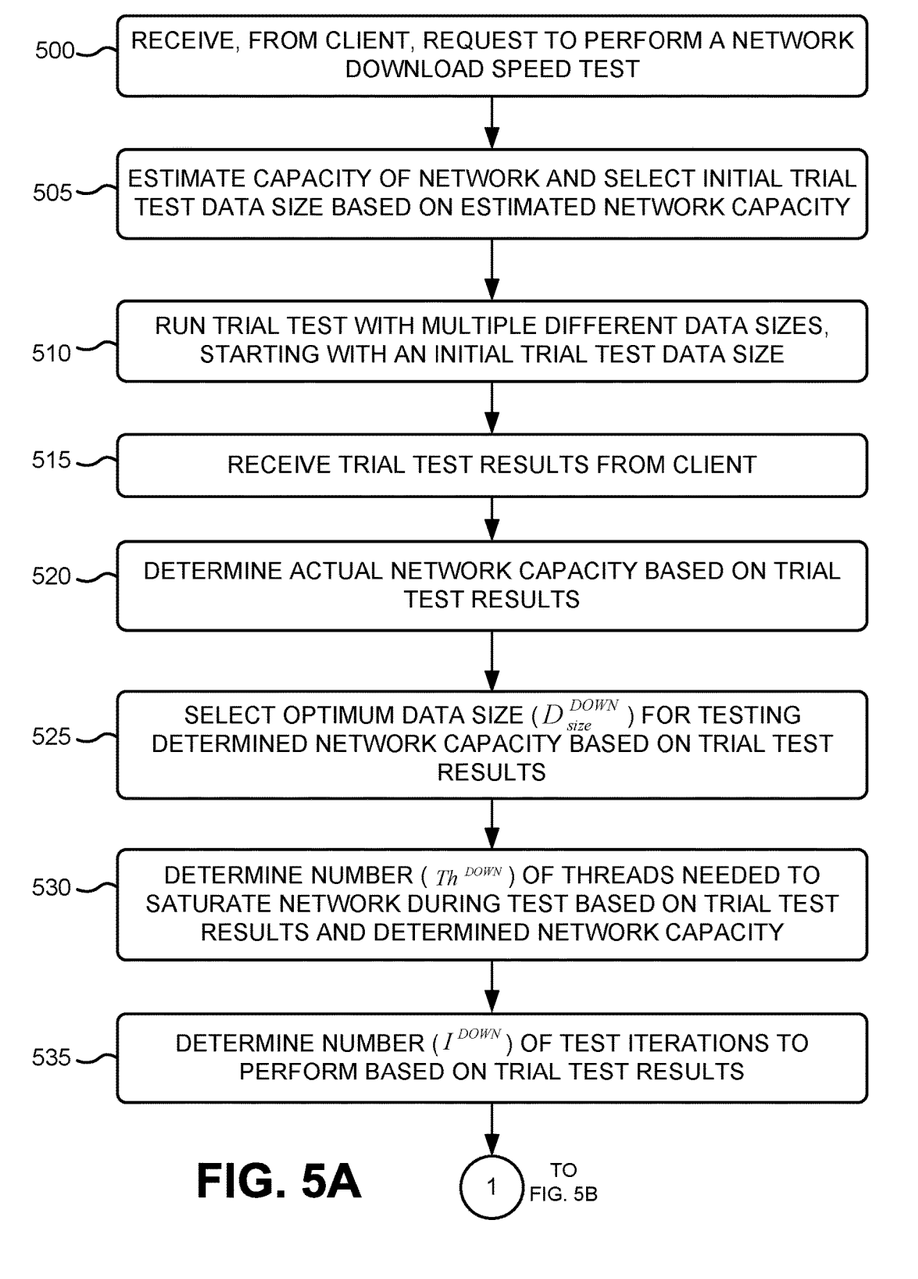
FIGS. 5A and 5B are flow diagrams illustrating an exemplary process for conducting a server-controlled network download speed test.
Figure 5B:
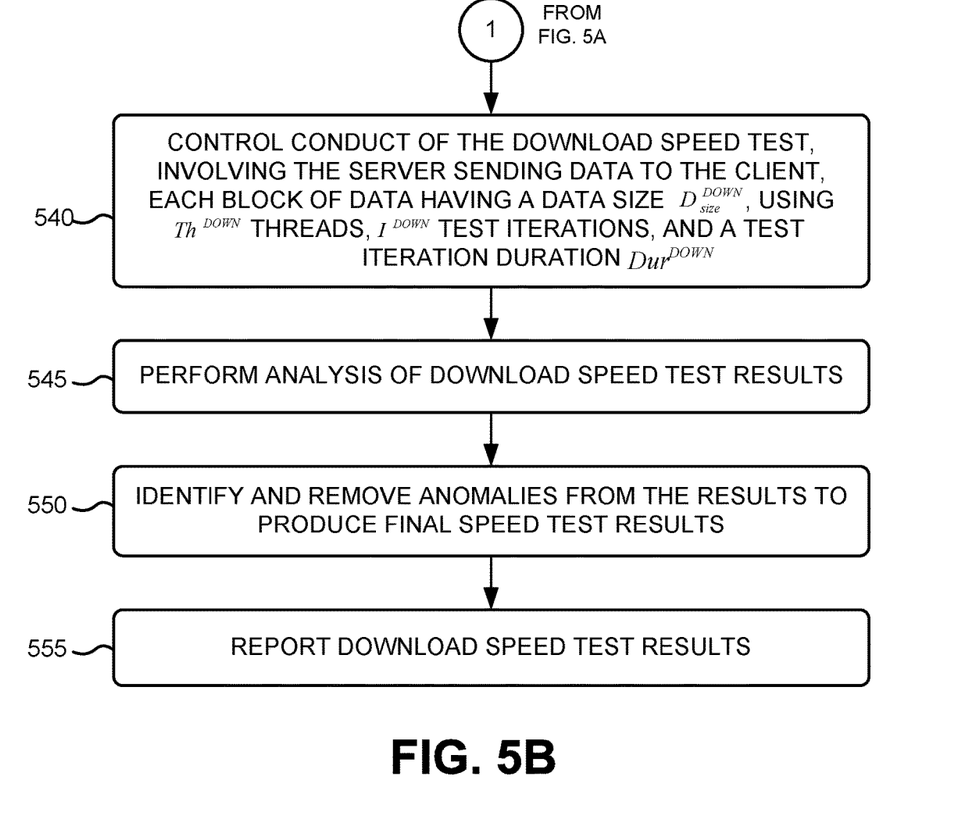

FIGS. 5A and 5B are flow diagrams illustrating an exemplary process for conducting a server-controlled network download speed test. The exemplary process of FIGS. 5A and 5B may be implemented by speed test control intelligence 105 of server 100. The exemplary process of FIGS. 5A and 5B is described with reference to FIGS. 1-4.

The exemplary process includes server 100 receiving, from client device 110, a request to perform a download test (block 500). User 210 may, via client device 110, select a download speed test to check the download speed from server 100 to client device 110 over network(s) 220. Once user 210 has selected a download speed test, client 110 may initiate the download speed test by sending a message to server 100 that requests the download speed test. The message to server 100 may identify a client ID (e.g., an IP address) of client device 110.

Server 100 estimates a capacity (e.g., throughput) of network(s) 220 and selects an initial trial test data size (block 505). Server 100 may maintain a database of network capacities for different types of networks, and may, based on knowledge of the one or more networks connecting server 100 with the requesting client device 110, estimate a corresponding download network capacity. For example, if network(s) 220 between server 100 and client device 110 includes the Internet connected to a PLMN, then the overall download network capacity may be known to be constrained by the PLMN, and server 100 may, based on knowledge of the PLMN, determine an approximate download network capacity of PLMN as the estimated download network capacity between server 100 and client device 110. Speed test control intelligence 105 of server 100 may select an initial trial test data size based on the estimated network capacity. In one implementation, the estimated network capacity may be classified into "speed tiers" and an initial trial test data size may be selected based on the particular "speed tier" into which the estimated network capacity has been classified. For example, there may be multiple different "speed tiers," including speed tier 1 having a first bandwidth range $BWR_1$, a speed tier 2 having a second bandwidth range $BWR_2$, a speed tier 3 having a third bandwidth range $BWR_3$, and so on up to an nth speed tier having an nth bandwidth range $BWR_n$, where $BWR_1 > BWR_2 > BWR_3 > \ldots > BWR_n$. Each of the multiple speed tiers may correspond to a particular initial trial test data size. As a specific example, an estimated network bandwidth may be 100 MB, falling within a speed tier that corresponds to an initial trial test data size of 1 MB. Therefore, in this example, speed test control intelligence 105 of server 100, based on an estimated bandwidth of 100 MB for the network capacity, may select 1 MB as the initial trial test data size of the data block to be sent for the trial test. As another specific example, an estimated network bandwidth may be 300 MB, falling within a speed tier that corresponds to an initial trial test data size of 10 MB. Therefore, in this example, speed test control intelligence 105 of server, based on an estimated bandwidth of 300 MB for the network capacity, may select 10 MB as the initial trial test data size of the data block to be sent for the trial test.

Server 100 runs the trial test with multiple different data sizes, starting with the initial trial test data size length (block 510). Server 100 may send series of groups of trial test data blocks, with each group of data blocks having a same size (i.e., a same amount of data) and the first group in the series starting with the selected initial trial test data size. From the initial trial test data size, server 100 may incrementally increase the trial test data size for each subsequent group of data blocks in the series. Thus, data block group #1 in the series has the initial trial test data size of $iDS_1$, the next data block group in the series has an incremented length of $iDS_2$ (where $iDS_2=iDS_1+\Delta$), the next data block group in the series has an incremented data block length of $iDS_3$ (where $iDS_3=iDS_1+2\Delta$), etc., where $\Delta$ is equal to a selected incremental quantity of bits. In one implementation, each group of data blocks may only include a single block of data having a particular data size, the size of which is incremented by the selected incremental quantity of bits $\Delta$. Running the trial test with the multiple different data sizes includes transmitting each block of data over network(s) 220, and determining the length of time it takes for the data block to be received at the client 110. Incrementing of the data block size may continue, with the transmission of each incremented data block, until a threshold length of time is achieved for the time it takes for the data block to be received at client 110. Server 100 takes note of the data block size when the threshold length of time is achieved.

Server 100 receives trial test results from client 110 (block 515). Server 100 determines an actual network capacity of network(s) 220 based on the received trial test results (block 520). Upon receipt of each data block in the series of initial trial test data blocks, client 110 determines various parameters associated with the communication of the data blocks from server 100 to client device 110 across network(s) 220. For example, client device 110 may calculate an actual network capacity (e.g., throughput in megabits per second (Mbps)) based on receipt of each group of trial test data blocks at client device 110. Client device 110 may return the various determined parameters to server 100 via a control thread. For example, once the threshold length of time is achieved for the time it takes for the transmitted data block to be received at client 110, described with respect to block 510 above, then server 100 may transmit a last data block, having an incremented data size corresponding to the data size used to achieve the threshold length of time for the time taken for the data block to be received at client 110. Server 100 may, for example, calculate a throughput, to determine the actual network capacity, based on the transmitted last data block.

Server 100 selects an optimum data block data size ($D_{size}^{DOWN}$) for testing the determined network capacity based on the trial test results (block 525). Server 100 may select the optimum data block data size $D_{size}^{DOWN}$ as the incremented data block size that achieved the threshold length of time for the time taken for the data block to be received at client 110 across network(s) 220 (i.e., as described in blocks 510, 515 and 520 above).

Server 100 determines the number ($Th^{DOWN}$) of threads needed to saturate the network during the speed test based on the trial test results and the determined network capacity (block 530). Saturation of the network requires that the speed test data blocks(s) sent from server 100 to client device 110 reach a maximum throughput ceiling. If one of the trial tests consists of a time duration of $Dur^{DOWN}$ and X data blocks of a size $D_{size}^{DOWN}$ (in bits or bytes), then the maximum throughput, for the particular trial test, may be measured at client 110 as $MAX\_TP=(X*D_{size}^{DOWN})/Dur^{DOWN}$. Server 100 may conduct multiple iterations of the trial test until the measured MAX_TP reaches a ceiling and no longer increases. Server 100 may then determine the number of threads $Th^{DOWN}$ to utilize during the network download speed test based on the following equation:

$$MAX\_TP=((X*D_{size}^{DOWN})/Dur^{DOWN})*Th^{DOWN} \qquad \text{Eqn. (1)}$$

where MAX_TP is the measured maximum network throughput,

X is the number of data blocks to be sent during an iteration of the download speed test, $D_{size}^{DOWN}$ is the selected download data block size, and $Dur^{DOWN}$ is the duration of the iteration of the speed test (i.e., the period of time over which the X data block(s) are transmitted from server 100).

Using Eqn. (1) and solving for the number of threads $Th^{DOWN}$ results in the following:

$$Th^{DOWN}=(Dur^{DOWN}*MAX\_TP)/X*D_{size}^{DOWN} \qquad \text{Eqn. (2)}$$

Alternatively, instead of using Eqn. (2), the determined number of threads $Th^{DOWN}$ may be based on which speed tier into which the measured value of MAX_TP falls. For example, if the measured MAX_TP falls within the bandwidth corresponding to a particular speed tier, then the number of threads are assigned based on the particular speed tier. As a particular example, if there are four speed tiers, with each higher speed tier having a higher bandwidth range than a lower speed tier, then an increasing number of threads ($Th^{DOWN}$) may be assigned to each speed tier. Therefore, as the measured MAX_TP falls within a particular speed tier, the number of threads $Th^{DOWN}$ assigned to that speed tier may be used for the download speed test.

Server 100 determines a number ($I^{DOWN}$) of test iterations to perform based on the trial test results (block 535). In one implementation, a fixed value for the number $I^{DOWN}$ of test iterations may be used, regardless of results of the trial test. Alternatively, the results of the trial test may indicate a need for a higher number of test iterations. For example, if a large variation in throughput is measured over the iterations of the trial test, then a greater number $I^{DOWN}$ of test iterations may be selected.

Server 100 controls the conduct of the download speed test, involving server 100 sending speed test data to client 110, with each block of data having the data block data size $D_{size}^{DOWN}$, using $Th^{DOWN}$ threads, $I^{DOWN}$ iterations, and the iteration test duration $Dur^{DOWN}$ (block 540). Server 100 may, via the $I^{DOWN}$ different iterations, send data blocks via the $Th^{DOWN}$ data threads, with each data block having a data block size $D_{size}^{DOWN}$, and each thread being transmitted over the test iteration duration $Dur^{DOWN}$. The download speed test being performed uses a fixed data block size $D_{size}^{DOWN}$ selected in block 525, a fixed number of threads $Th^{DOWN}$ selected in block 530, a fixed number of iterations $I^{DOWN}$ selected in block 535, and a fixed duration $Dur^{DOWN}$ selected in block 540 for the final download speed test.

Figure 6:
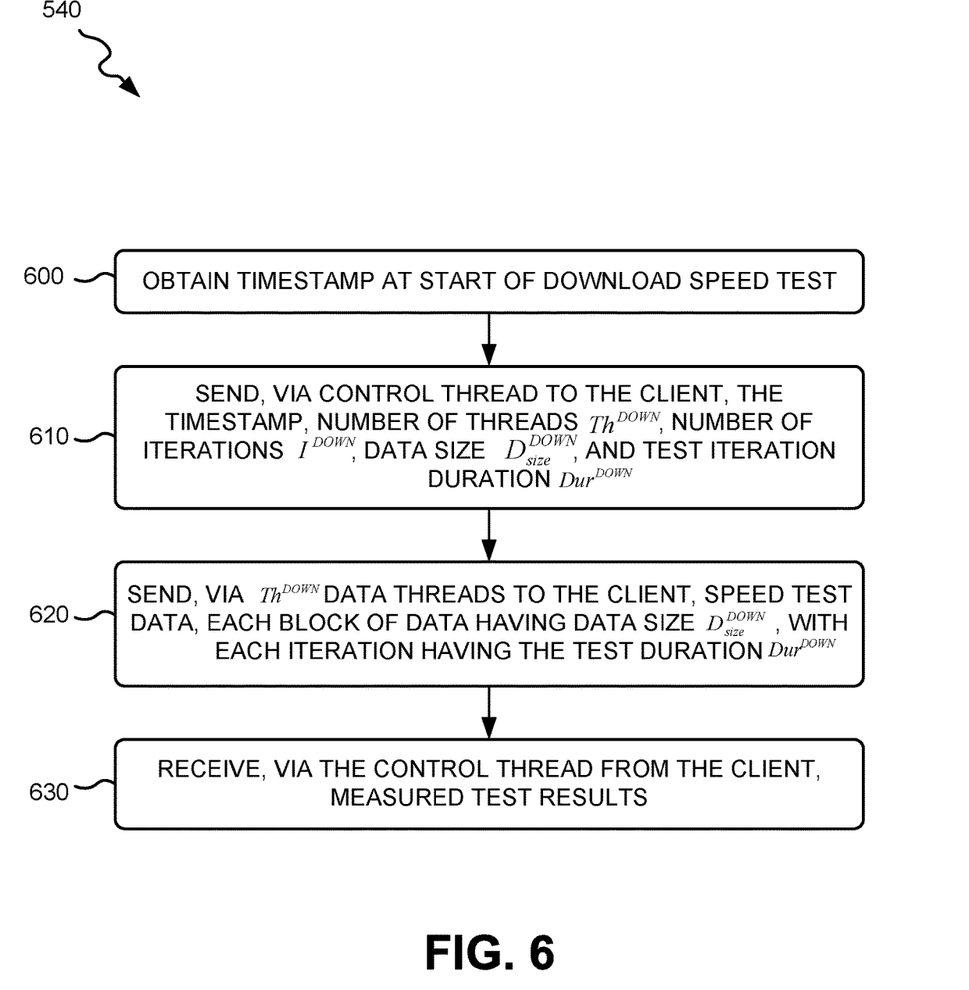
FIG. 6 is a flow diagram illustrating an exemplary implementation of block 535 of FIG. 5B.

One exemplary implementation of block 540 of FIG. 5B is depicted in FIG. 6. As shown, controlling the conduct of the download speed test may include obtaining a timestamp at the start of the download speed test (block 600), and sending, via a control thread to client 110, the timestamp, the number of threads $Th^{DOWN}$ (determined in block 530 of FIG. 5A), the number of test iterations $I^{DOWN}$ (determined in block 535 of FIG. 5A), the data size $D_{size}^{DOWN}$, and the test iteration duration $Dur^{DOWN}$ (block 610). Server 100 may, for example, maintain an internal clock that keeps track of the UTC time and, at the outset of the download speed test (e.g., at the instance speed test data blocks are sent across network(s) 220 to client device 110), speed test control intelligence 105 of server 100 obtains the current UTC time. In addition to sending the timestamp, number of threads $Th^{DOWN}$, number of test iterations $I^{DOWN}$, data size $D_{size}^{DOWN}$, and test iteration duration $Dur^{DOWN}$ to client device 100, server 100 may store the data in an entry 400 of speed test database 215. For example, server 100 may store the client ID associated with client device 110 in client ID field 405, and may assign a particular speed test ID to the current download speed test and store the speed test ID in field 410, of an entry 400 of DB 215. Server 100 may additionally set the flag in download flag field 415 and reset the flag in upload flag field 420. Server 100 may further store the obtained UTC time in start timestamp field 425, the data size $D_{size}^{DOWN}$ in field 430, the number of threads $Th^{DOWN}$ in field 435, the number of test iterations $I^{DOWN}$ in field 440, and the test iteration duration $Dur^{DOWN}$ in field 445 of the entry 400 of DB 215.

As further shown in FIG. 6, controlling the conducting of the download speed test may also include sending, via $Th^{DOWN}$ data threads, speed test data blocks, each data block the data size $D_{size}^{DOWN}$, with each iteration having the test duration $Dur^{DOWN}$ (block 620); and receiving, via the control thread from client 110, the test results measured at client 110 (block 630). For each one of the $Th^{DOWN}$ threads, client 110 measures how many H data blocks of size $D_{size}^{DOWN}$ are received over the test duration $Dur^{DOWN}$ and then calculates the thread throughput, for each thread, by the following:

$$\text{thread\_throughput} = (H * D^{DOWN})/Dur^{DOWN} \qquad \text{Eqn. (3)}$$

Client 110 may then calculate the total download throughput by the following:

$$\text{total\_throughput} = \sum_{1}^{Th} \text{thread\_througput} \qquad \text{Eqn. (4)}$$

where Eqn. (4) sums the thread_throughput values calculated for each of the threads 1, 2, . . . , $Th^{DOWN}$ of the $Th^{DOWN}$ threads to determine the total_throughput value for this iteration of the download speed test. Client 110 may perform the measurements and calculations associated with Eqns. (3) and (4) for each iteration of the $I^{DOWN}$ iterations of the download speed test, resulting in calculations of $I^{DOWN}$ total_throughput values. The test results sent via the control thread from client 110 may include, for example, each measured thread_throughput for each thread of the $Th^{DOWN}$ threads for each of the $I^{DOWN}$ iterations, and the calculated total_throughput over all $Th^{DOWN}$ threads of each of the $I^{DOWN}$ iterations.

Returning to FIG. 5B, server 100 performs an analysis of the download speed test results (block 545) received from client 110. Speed test control intelligence 105 of server 100 may perform one or more types of statistical analyses on the download speed test results received from client 110. For example, speed test control intelligence 105 may determine an average of the total_throughput values for the $I^{DOWN}$ iterations of the download speed test. Additionally, speed test control intelligence 105 may determine the standard deviation (SD) of the total_throughput values for the $I^{DOWN}$ iterations of the download speed test.

Server 100 identifies and removes anomalies from the results to produce final speed test results (block 545). Speed test control intelligence 105 of server 100 may compare the different total_throughput values for the $I^{DOWN}$ iterations of the download speed test and identify total_throughput values that are anomalous relative to other values of the $I^{DOWN}$ iterations. For example, speed test control intelligence 105 may identify one or more total_throughput values of the $I^{DOWN}$ iterations, that are greater than or less than the determined average total_throughput value by a certain defined value, as anomalous. The total_throughput values of the $I^{DOWN}$ iterations identified as anomalous may be removed from the test results, and the average of the total_throughput values may be recalculated. Server 100 may, therefore, remove outliers (e.g., highest and lowest values) from the test results for the $I^{DOWN}$ iterations of the download speed test.

Server 100 reports the download speed test results (block 550). Server 100 may report the final download speed test results by sending, via network(s) 220, a message to client 110 that includes, for example, the calculated average of the total_throughput values for the $I^{DOWN}$ iterations of the download speed test (minus any removed, anomalous values).

The exemplary process of FIGS. 5A and 5B may be repeated for each request for a download speed test received at server 100 from a client device 110.

Figure 7A:
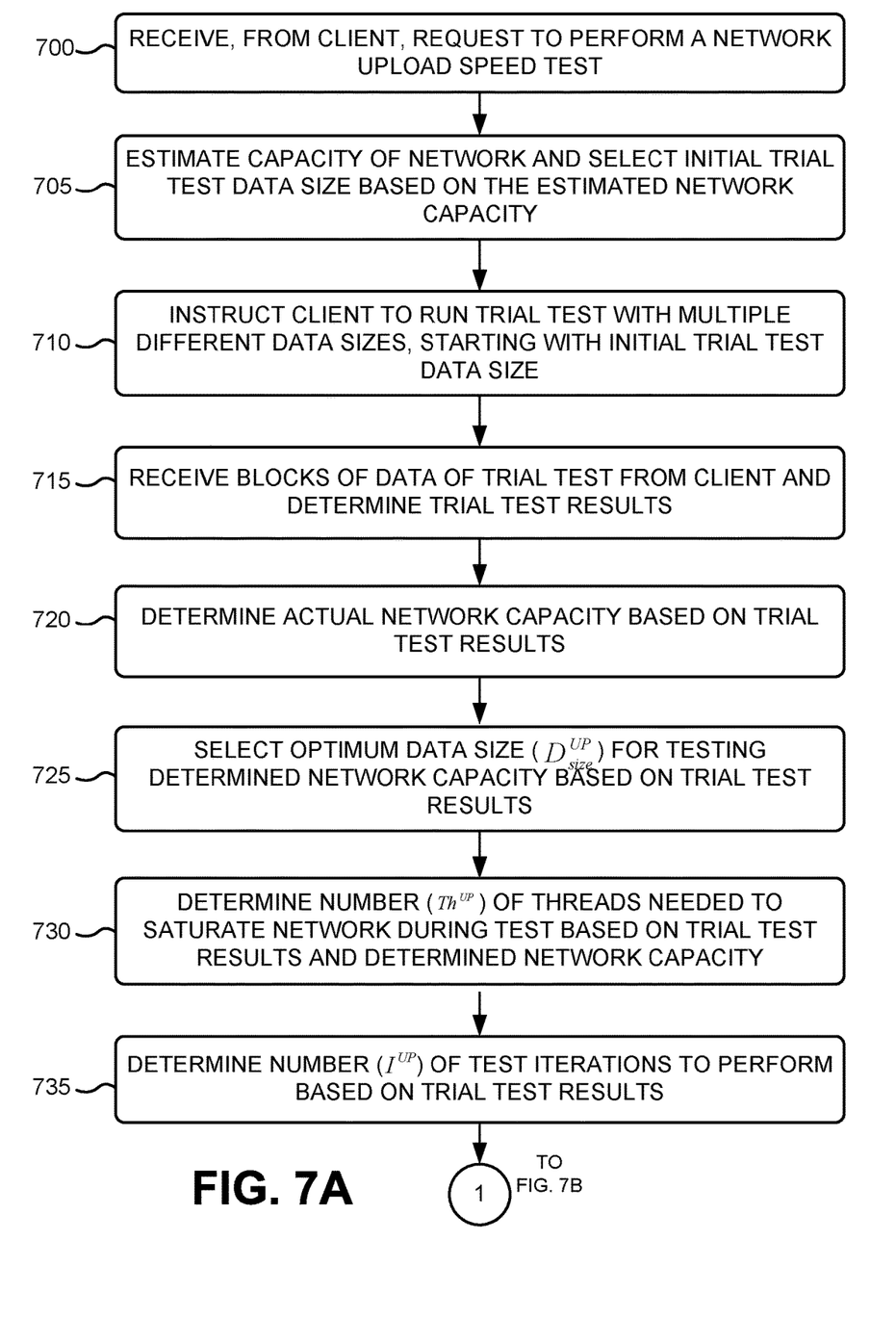
FIGS. 7A and 7B are flow diagrams illustrating an exemplary process for conducting a server-controlled network upload speed test.
Figure 7B:
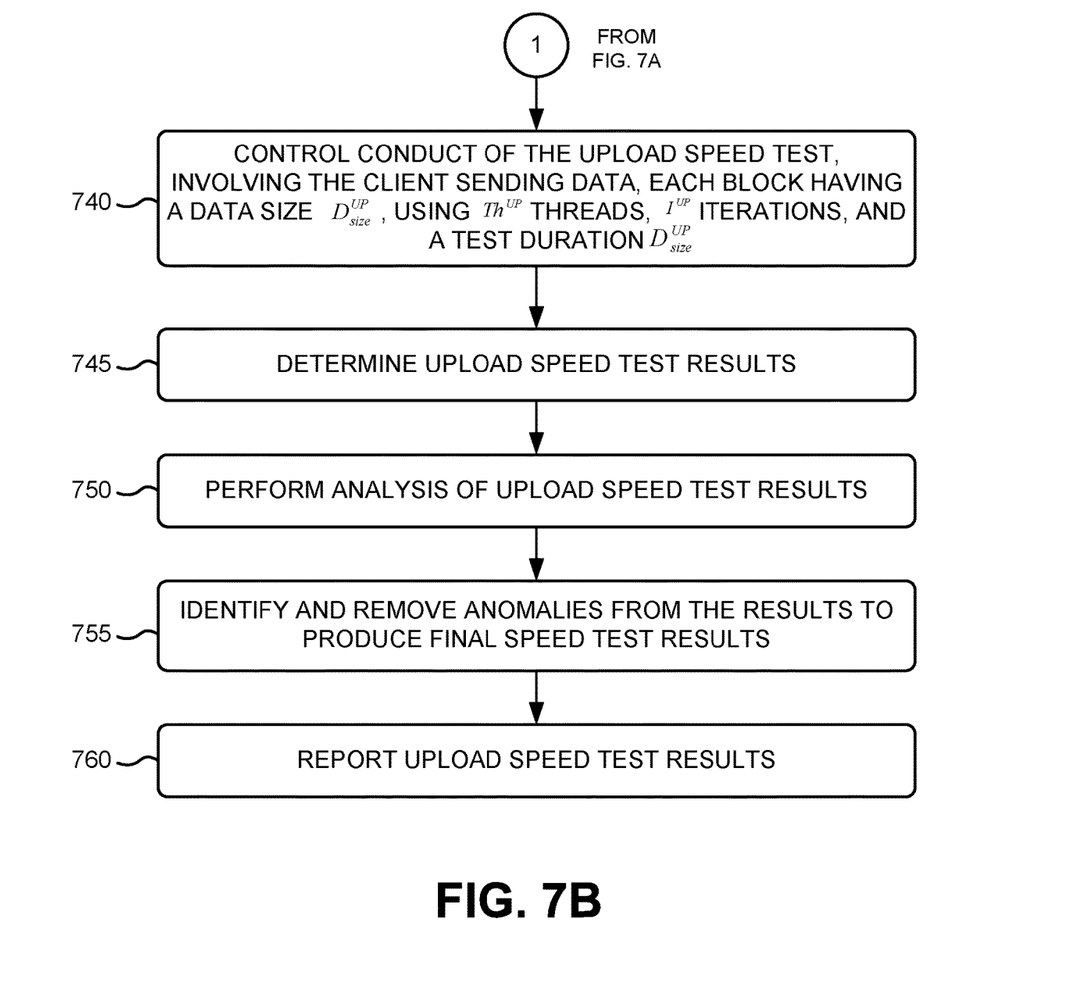

FIGS. 7A and 7B are flow diagrams illustrating an exemplary process for conducting a server-controlled network upload speed test. The exemplary process of FIGS. 7A and 7B may be implemented by speed test control intelligence 105 of server 100. The exemplary process of FIGS. 7A and 7B is described with reference to FIGS. 1-4.

The exemplary process includes server 100 receiving, from client 110, a request to perform a network upload speed test (block 700). User 210 may, via client device 110, select an upload speed test to check the upload network speed from client device 110 to server 100 over network(s) 220. Once user 210 has selected an upload speed test, client 110 may initiate the upload speed test by sending a message to server 100 that requests the upload speed test. The message to server 100 may identify a client ID (e.g., an IP address) of client device 110.

Server 100 estimates a capacity (e.g., throughput) of the network and selects an initial trial test data size based on the estimated network capacity (block 705). As already described above with respect to FIG. 5A, server 100 may maintain a database of network capacities for different types of networks, and may, based on knowledge of the one or more networks connecting server 100 with the requesting client device 110, estimate a corresponding upload network capacity. For example, if network(s) 220 between server 100 and client device 110 includes the Internet connected to a PLMN, then the overall upload network capacity may be known to be constrained by the PLMN, and server 100 may, based on knowledge of the PLMN, determine an approximate upload network capacity of PLMN as the estimated upload network capacity between client device 110 and server 100. Speed test control intelligence 105 of server 100 may select an initial trial test data block size based on the estimated network capacity. In one implementation, the estimated network capacity may be classified into "speed tiers" and an initial trial test data size may be selected based on the particular "speed tier" into which the estimated network capacity has been classified. For example, there may be multiple different "speed tiers," including speed tier 1 having a first bandwidth range $BWR_1$, a speed tier 2 having a second bandwidth range $BWR_2$, a speed tier 3 having a third bandwidth range $BWR_3$, and so on up to an nth speed tier having an nth bandwidth range $BWR_n$, where $BWR_1 > BWR_2 > BWR_3 > \ldots > BWR_n$. Each of the multiple speed tiers may correspond to a particular initial trial test data size. As a specific example, an estimated network bandwidth may be 100 MB, falling within a speed tier that corresponds to an initial trial test data size of 1 MB.

Therefore, in this example, speed test control intelligence 105 of server 100, based on an estimated bandwidth of 100 MB for the network capacity, may select 1 MB as the initial trial test data size of the data block to be sent for the trial test. As another specific example, an estimated network bandwidth may be 300 MB, falling within a speed tier that corresponds to an initial trial test data size of 10 MB. Therefore, in this example, speed test control intelligence 105 of server, based on an estimated bandwidth of 300 MB for the network capacity, may select 10 MB as the initial trial test data size of the data block to be sent for the trial test.

Server 100 instructs client 110 to run a trial test with multiple different data sizes, starting with the selected initial trial test data size (block 710). Server 100 may instruct client 110 to send series of groups of trial test data blocks, with each group of data blocks having a same data size (i.e., a same amount of data) and the first group in the series starting with the selected initial trial test data size. From the initial trial test data size, server 100 may instruct client 110 to incrementally increase the trial test data size for each subsequent group of data blocks in the series. Thus, data block group #1 in the series may have the initial trial test data size $iDS_1$, the next data block group in the series has an incremented data size of $iDS_2$ (where $iDS_2=iDS_1+\Delta$), the next data block group in the series has an incremented data size of $iDS_3$ (where $iDS_3=iDS_1+2\Delta$), etc., where $\Delta$ is equal to a selected incremental quantity of bits. In one implementation, each group of data blocks may only include a single block of data having a particular data size, the size of which is incremented by the selected incremental quantity of bits $\Delta$. Running the trial test with the multiple different data sizes includes client 110 transmitting each block of data over network(s) 220, and determining the length of time it takes for the data block to be received at server 100. Incrementing of the data block size may continue, with the transmission of each incremented data block, until a threshold length of time is achieved for the time it takes for the data block to be received at server 100 from client 110. Server 100 takes note of the data block size when the threshold length of time is achieved.

Server 100 receives data blocks of the trial test from client 110, and determines trial test results (block 715). Server 100 determines an actual network capacity of network(s) 220 based on the determined trial test results (block 720). Upon receipt of each data block group in the series of trial test data blocks from client 110, speed test control intelligence 105 of server 100 determines various parameters associated with the communication of the data blocks from client 110 to server 100 across network(s) 220. For example, speed test control intelligence 105 may calculate an actual network capacity (e.g., throughput in megabits per second (Mbps)) based on receipt of each group of trial test data blocks from client device 110. For example, once the threshold length of time is achieved for the time it takes for the transmitted data block to be received from client 110 at server 100, described with respect to block 710 above, then client 110 may transmit a last data block, having an incremented data size corresponding to the data size used to achieve the threshold length of time for the time taken for the data block to be received at server 100. Server 100 may, for example, calculate a throughput, to determine the actual network capacity, based on the transmitted last data block.

Server 100 selects an optimum data block size ($D_{size}^{UP}$) for testing the determined network capacity based on the trial test results (block 725). Server 100 may select the optimum data block data size $D_{size}^{UP}$ as the incremented data block size that achieved the threshold length of time for the time taken for the data block to be received by server 100 from client 110 across network(s) 220 (i.e., as described in blocks 705-720 above) Server 100 determines a number ($Th^{UP}$) of threads needed to saturate the network during the upload speed test based on the trial test results and the determined network capacity (block 730). Saturation of the network requires that the speed test data blocks sent from client device 110 to server 100 reach a maximum throughput ceiling. If one of the trial tests consists of a time duration of $Dur^{UP}$ and X data blocks of a data size $D_{size}^{UP}$ (in bits or bytes), then the maximum throughput, for the particular trial test, may be measured at server 100 as $MAX\_TP=(X*D_{size}^{UP})/Dur^{UP}$. Server 100 may instruct client 110 to conduct multiple iterations of the trial test until the measured MAX_TP reaches a ceiling and no longer increases. Server 100 may then determine the number of threads $Th^{UP}$ to utilize during the network upload speed test based on Eqn. (2), similar to the description given with respect to block 530 of FIG. 5A.

Server 100 determines a number ($I^{UP}$) of test iterations to perform based on the trial test results (block 735). In one implementation, a fixed value for the number $I^{UP}$ of test iterations may be used, regardless of results of the trial test. Alternatively, the results of the trial test may indicate a need for a higher number of test iterations. For example, if a large variation in throughput is measured over the iterations of the trial test, then a greater number $I^{UP}$ of test iterations may be selected.

Server 100 controls the conduct of the upload speed test, involving client 110 sending speed test data blocks, with each data block having the data size $D_{size}^{UP}$, using $Th^{UP}$ threads, $I^{UP}$ iterations, and a test iteration duration $Dur^{UP}$ (block 740). Server 100 may instruct client 110 to, via the $I^{UP}$ different iterations, send data blocks via the $Th^{UP}$ data threads, with each data block having a data size $D_{size}^{UP}$, and each thread being transmitted over the test iteration duration $Dur^{UP}$ The upload speed test being performed uses a fixed data block size $D_{size}^{UP}$ selected in block 725, a fixed number of threads $Th^{UP}$ selected in block 730, a fixed number of iterations $I^{UP}$ selected in block 735, and a fixed duration $Dur^{UP}$ selected in block 740 for the final download speed test.

Figure 8:
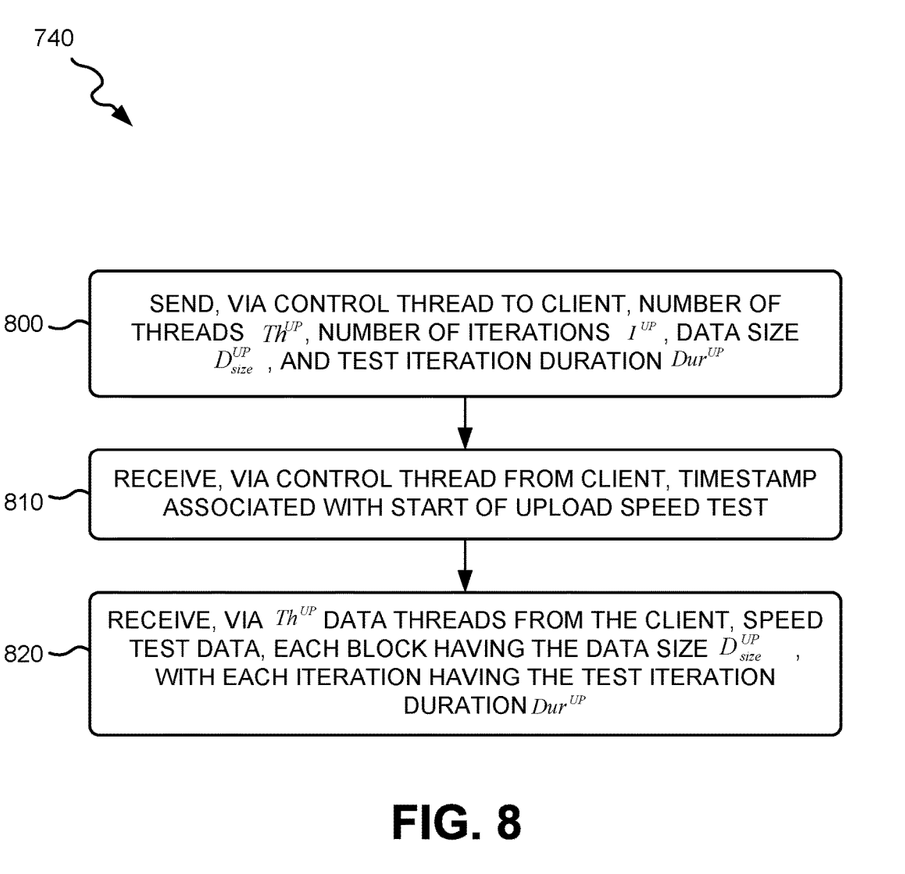
FIG. 8 is a flow diagram illustrating an exemplary implementation of block 735 of FIG. 7B.

One exemplary implementation of block 740 of FIG. 7B is depicted in FIG. 8. As shown in FIG. 8, controlling the conduct of the upload speed test may include server 100 sending, via a control thread to client 110, the number of threads $Th^{UP}$, the number of test iterations $I^{UP}$, the data size $D_{size}^{UP}$, and the test iteration duration $Dur^{UP}$ (block 800). In addition to sending the number of threads $Th^{UP}$, number of test iterations $I^{UP}$, data block size $D_{size}^{UP}$, and test iteration duration $Dur^{UP}$ to client device 110, server 100 may store the data in an entry 400 of speed test database 215. For example, server 100 may store the client ID associated with client device 110 in client ID field 405, and may assign a particular speed test ID to the current upload speed test and store the speed test ID in field 410, of an entry 400 of DB 215. Server 100 may additionally reset the flag in download flag field 415, and set the flag in upload flag field 420. Server 100 may further store the data size $D_{size}^{UP}$ in field 430, the number of threads $Th^{UP}$ in field 435, the number of test iterations $I^{UP}$ in field 440, and the test iteration duration $Dur^{UP}$ in field 445 of the entry 400 of DB 215.

As further shown in FIG. 8, controlling the conducting of the upload speed test may further include receiving, via a control thread from client 110, a timestamp associated with the start of the upload speed test (block 810); and receiving, via $Th^{UP}$ data threads, one or more upload speed test data blocks from client 110, each data block having the data size $D_{size}^{UP}$, with each iteration having the test iteration duration $Dur^{UP}$ (block 820). Client device 110 may maintain an internal clock that keeps track of the UTC time and, at the outset of the upload speed test (e.g., at the instance speed test data blocks are sent across network(s) 220 to server 100), client device 110 obtains the current UTC time, and sends the current UTC time as a timestamp to server 100 via a control thread. Upon receipt of the timestamp at server 100 from client device 110, server 100 may store the UTC time in start timestamp field 425 of the entry 400 of DB 215 dealt with in block 800.

Returning to FIG. 7B, server 100 determines the upload speed test results (block 745). For each one of the $Th^{UP}$ threads, speed test control intelligence 105 of server 100 measures how many H data blocks of data size $D_{size}^{UP}$ are received over the test duration $Dur^{UP}$ and then calculates the thread throughput using, for example, Eqn. (3) above (e.g., thread_throughput=$(H*D_{size}^{UP})/Dur^{UP}$). Speed test control intelligence 105 of server 100 may then calculate the total upload throughput using, for example, Eqn. (4) above $$\left(e.g., \text{total\_throughput} = \sum_{1}^{Th} \text{thread\_throughput}\right).$$

Server 100 may perform the measurements and calculations associated with Eqns. (3) and (4) for each iteration of the $I^{UP}$ iterations of the upload speed test, resulting in calculations of $I^{UP}$ total_throughput values. The test results may then include, for example, each measured thread_throughput for each thread of the $Th^{UP}$ threads for each of the $I^{UP}$ iterations, and the calculated total_throughput over all $Th^{UP}$ threads of each of the $I^{UP}$ iterations.

Server 100 performs an analysis of the upload speed test results (block 750). Similar to block 545 of FIG. 5B, speed test control intelligence 105 of server 100 may perform one or more types of statistical analyses on the upload speed test results determined at server 100. For example, speed test control intelligence 105 may determine an average of the total_throughput values for the $I^{UP}$ iterations of the upload speed test. Additionally, speed test control intelligence 105 may determine the standard deviation (SD) of the total_throughput values for the $I^{UP}$ iterations of the upload speed test.

Server 100 identifies and removes anomalies from the results to produce final speed test results (block 755). Speed test control intelligence 105 of server 100 may compare the different total_throughput values for the $I^{UP}$ iterations of the upload speed test, and identify total_throughput values that are anomalous relative to other values of the $I^{UP}$ iterations. For example, speed test control intelligence 105 may identify one or more total_throughput values of the $I^{UP}$ iterations, that are greater than or less than the determined average total_throughput value by a certain defined value, as anomalous. The total_throughput values of the $I^{UP}$ iterations identified as anomalous may be removed from the test results, and the average of the total_throughput values may be recalculated. Server 100 may, therefore, remove outliers (e.g., highest and lowest values) from the test results for the $I^{UP}$ iterations of the upload speed test.

Server 100 reports the upload speed test results (block 760). Server 100 may report the final upload speed test results by sending, via network(s) 220, a message to client 110 that includes, for example, the calculated average of the total_throughput values for the $I^{UP}$ iterations of the upload speed test (minus any removed, anomalous values).

The exemplary process of FIGS. 7A and 7B may be repeated for each request for an upload speed test received at server 100 from a client device 110.

In embodiments where users 210-1 through 210-*n* are customers of a particular network provider, such as, for example, a network provider associated with the PLMN of network(s) 220, the results of the download and/or upload speed tests obtained at server 100 may be used for personalizing network service offerings to users 210-1 through 210-*n*. The network provider, who maintains a customer profile of the network service subscribed to by a particular user 210, may compare the results of any download and/or upload speed tests obtained at server 100 with a network service level to which user 210 has currently subscribed. For example, if the download and/or upload speed test results indicate that the network speed test is greater than, or equal to, the network speed level subscribed to by the user 210, then server 100 may attempt to "upsell" a higher available network speed by sending an offer to user 210 at client device 110. The offer may specify an increased network speed, and a current offered price for the increased network speed. Upon receipt of the offer at client device 110, user 210 may indicate his acceptance of the offer (e.g., via a user interface of client device 110), and server 100 may cause the customer profile of the user 210 to be updated to indicate the new network speed level to which user 210 has subscribed.

Additionally, the results of the download and/or upload speed tests obtained at server 100 may be used for personalizing network service troubleshooting of network service to respect client devices 110 of users 210. If the download and/or upload speed test results indicate that the network speed test is less than the network speed level subscribed to by the user 210, then server 100 may attempt to troubleshoot the network, and provide results of that troubleshooting to user 210. For example, server 100 may consult network service records to identify whether any network outage or deficiency currently exists that would impact download and/or upload network service to the user 210 and would, thus, explain the deficiencies in the network speed test results obtained at server 100. A message, explaining the results of the network troubleshooting, may be sent to the user 210 at client device 110, possibly with an indication when the deficiency in network service is anticipated to be corrected.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A, 5B, 6, 7A, 7B, and 8, the order of the blocks may be varied in other implementations. Additionally, while message, thread and/or activity flows have been described with respect to FIG. 1, the order of the message, thread and/or activity flows may be varied in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a network device from a client device, a request to perform a network speed test of a network connecting the client device and the network device;
   conducting a trial test, involving data delivery between the network device and the client device, to determine an approximate capacity of the network;
   selecting an optimum data size based on results of the trial test;
   selecting a number of threads needed to saturate the network based on the results of the trial test; and
   controlling conducting of the network speed test, using a control thread from the network device to the client device, wherein the network speed test utilizes the optimum data size and the selected number of threads.

2. The method of claim 1, wherein conducting the trial test comprises:
   estimating a capacity of the network; and
   selecting an initial trial test data size for use in conducting the trial test based on the estimated capacity of the network.

3. The method of claim 2, wherein conducting the trial test further comprises:
   running the trial test with multiple different data sizes, wherein the trial test is started with the selected initial trial test data size.

4. The method of claim 1, further comprising:
   selecting a number of test iterations for the network speed test based on the results of the trial test,
   wherein controlling the conducting of the network speed test further utilizes the selected number of test iterations.

5. The method of claim 1, wherein the network speed test comprises a network download speed test and wherein controlling the conducting of the network speed test comprises:
   obtaining a timestamp at a start of the network download speed test;
   sending, via the control thread from the network device to the client device, the timestamp, the optimum data size, and the selected number of threads;
   sending, via the selected number of threads, test data blocks, with each of the test data blocks having the optimum data size; and
   receiving, at the network device via the control thread from the client device, measured results of the network download speed test from the client device measuring parameters associated with the test data blocks.

6. The method of claim 1, wherein the network speed test comprises a network upload speed test and wherein controlling the conducting of the network speed test comprises:
   sending, via the control thread from the network device to the client device, the optimum data size and the selected number of threads;
   receiving, at the network device via the control thread from the client device, a timestamp associated with a start of the network upload speed test; and
   receiving, at the network device via the selected number of threads from the client device, test data blocks, with each of the test data blocks having the optimum data size.

7. The method of claim 1, further comprising:
   performing, at the network device, an analysis of results of the conducted network speed test; and
   reporting, to the client device, the results of the conducted network speed test using the analysis.

8. A network device, comprising:
   a communication interface configured to connect to a network and to:
      receive, from a client device via the network, a request to perform a network speed test; and
   a processing unit, or logic, coupled to the communication interface, and configured to:
      conduct a trial test, involving data delivery between the network device and the client device via the communication interface, to determine an approximate capacity of the network,
      select an optimum data size based on results of the trial test,
      select a number of threads needed to saturate the network based on the results of the trial test, and
      control conducting of the network speed test, using a control thread via the communication interface from the network device to the client device, wherein the network speed test utilizes the optimum data size and the selected number of threads.

9. The network device of claim 8, wherein, when conducting the trial test, the processing unit, or logic, is further configured to:
   estimate a capacity of the network; and
   select an initial trial test data size for use in conducting the trial test based on the estimated capacity of the network.

10. The network device of claim 9, wherein, when conducting the trial test, the processing unit, or logic, is further configured to:
    run the trial test with multiple different data sizes, wherein the trial test is started with the selected initial trial test data size.

11. The network device of claim 8, wherein the processing unit, or logic, is further configured to:
    select a number of test iterations for the network speed test based on the results of the trial test, wherein controlling the conducting of the network speed test further utilizes the selected number of test iterations.

12. The network device of claim 8, wherein the network speed test comprises a network download speed test and wherein, when controlling the conducting of the network speed test comprises, the processing unit, or logic, is further configured to:
obtain a timestamp at a start of the network download speed test, and
wherein the communication interface is further configured to:
send, via the control thread from the network device to the client device, the timestamp, the optimum data size, and the selected number of threads,
send, via the selected number of threads, test data blocks, with each of the test data blocks having the optimum data size, and
receive, at the network device via the control thread from the client device, measured results of the network download speed test from the client device measuring parameters associated with the test data blocks.

13. The network device of claim 8, wherein the network speed test comprises a network upload speed test and wherein, when controlling the conducting of the network speed test, the communication interface is further configured to:
send, via the control thread to the client device, the optimum data size and the selected number of threads;
receive, via the control thread from the client device, a timestamp associated with a start of the network upload speed test; and
receive, via the selected number of threads from the client device, test data blocks, with each of the test data blocks having the optimum data size.

14. The network device of claim 8, wherein the processing unit, or logic, is further configured to:
perform an analysis of results of the conducted network speed test; and
report, to the client device, the results of the conducted network speed test using the analysis.

15. A non-transitory storage medium storing instructions executable by a processing unit of a network device, wherein the instructions comprise instructions to cause the processing unit to:
receive, at the network device from a client device, a request to perform a network speed test of a network connecting the client device and the network device;
conduct a trial test, involving data delivery between the network device and the client device, to determine an approximate capacity of the network;
select, at the network device, an optimum data size based on results of the trial test;
select, at the network device, a number of threads needed to saturate the network based on the results of the trial test; and
control conducting of the network speed test, using a control thread from the network device to the client device, wherein the network speed test utilizes the optimum data size and the selected number of threads.

16. The non-transitory storage medium of claim 15, wherein the instructions to cause the processing unit to conduct the trial test further comprise instructions to cause the processing unit to:
estimate a capacity of the network; and
select an initial trial test data size for use in conducting the trial test based on the estimated capacity of the network.

17. The non-transitory storage medium of claim 16, wherein the instructions to cause the processing unit to conduct the trial test further comprise instructions to cause the processing unit to:
run the trial test with multiple different data sizes, wherein the trial test is started with the selected initial trial test data size.

18. The non-transitory storage medium of claim 15, wherein the instructions further comprise instructions to cause the processing unit to:
select a number of test iterations for the network speed test based on the results of the trial test,
wherein controlling the conducting of the network speed test further utilizes the selected number of test iterations.

19. The non-transitory storage medium of claim 15, wherein the network speed test comprises a network download speed test and wherein the instructions to cause the processing unit to conduct the trial test further comprise instructions to cause the processing unit to:
obtain a timestamp at a start of the network download speed test;
send, via the control thread from the network device to the client device, the timestamp, the optimum data size, and the selected number of threads;
send, via the selected number of threads, test data blocks, with each of the test data blocks having the optimum data size; and
receive, at the network device via the control thread from the client device, measured results of the network download speed test from the client device measuring parameters associated with the test data blocks.

20. The non-transitory storage medium of claim 15, wherein the network speed test comprises a network upload speed test and wherein the instructions to cause the processing unit to conduct the trial test further comprise instructions to cause the processing unit to:
send, via the control thread from the network device to the client device, the optimum data size and the selected number of threads;
receive, at the network device via the control thread from the client device, a timestamp associated with a start of the network upload speed test; and
receive, at the network device via the selected number of threads from the client device, test data blocks, with each of the test data blocks having the optimum data size.

* * * * *